US012651362B2

(12) United States Patent
Abeysekara et al.

(10) Patent No.: US 12,651,362 B2
(45) Date of Patent: Jun. 9, 2026

(54) SYSTEM AND METHOD FOR VALIDATING DEPTH DATA FOR A DIMENSIONING OPERATION

(71) Applicant: ZEBRA TECHNOLOGIES CORPORATION, Lincolnshire, IL (US)

(72) Inventors: Sumudu B. Abeysekara, Marassana (LK); Michael Wijayantha Medagama, Nawala (LK)

(73) Assignee: Zebra Technologies Corporation, Lincolnshire, IL (US)

( * ) Notice: Subject to any disclaimer, the term of this patent is extended or adjusted under 35 U.S.C. 154(b) by 458 days.

(21) Appl. No.: 18/118,929

(22) Filed: Mar. 8, 2023

(65) Prior Publication Data

US 2024/0303847 A1    Sep. 12, 2024

(51) Int. Cl.
  *G06T 7/593*    (2017.01)
  *G06T 7/11*     (2017.01)
  *G06T 7/33*     (2017.01)

(52) U.S. Cl.
  CPC .............. *G06T 7/593* (2017.01); *G06T 7/11* (2017.01); *G06T 7/337* (2017.01)

(58) Field of Classification Search
  CPC . G06T 7/593; G06T 7/11; G06T 7/337; G06T 2207/10028; G06T 2207/30164; G06T 7/001
  See application file for complete search history.

(56) References Cited

U.S. PATENT DOCUMENTS

| | | | | |
|---|---|---|---|---|
| 9,996,981 | B1 * | 6/2018 | Tran | H04N 5/272 |
| 10,593,042 | B1 * | 3/2020 | Douillard | G06V 20/64 |
| 11,836,218 | B2 * | 12/2023 | Thrimawithana | G06T 7/11 |
| 12,307,676 | B2 * | 5/2025 | Kang | G06T 5/73 |
| 12,354,215 | B1 * | 7/2025 | Langlois | G06T 7/11 |
| 2017/0023780 | A1 * | 1/2017 | Braker | G03B 37/06 |
| 2017/0124717 | A1 * | 5/2017 | Baruch | G06T 7/136 |
| 2018/0053305 | A1 * | 2/2018 | Gu | G06T 7/55 |
| 2018/0089505 | A1 * | 3/2018 | El-Khamy | G06V 40/103 |
| 2019/0073825 | A1 * | 3/2019 | Lee | G06T 17/00 |
| 2020/0288104 | A1 * | 9/2020 | Sheng | G06F 3/04883 |
| 2021/0150227 | A1 * | 5/2021 | Hu | G06V 20/64 |
| 2021/0158558 | A1 * | 5/2021 | Thrimawithana | G06T 7/62 |
| 2021/0167487 | A1 * | 6/2021 | Varma | H01Q 25/005 |
| 2021/0168230 | A1 * | 6/2021 | Baker | G06F 1/1635 |
| 2021/0168231 | A1 * | 6/2021 | Baker | H05K 1/189 |
| 2021/0241472 | A1 * | 8/2021 | Yokoyama | G06T 7/0006 |
| 2021/0343035 | A1 * | 11/2021 | Liyanaarachchi | G01B 11/022 |
| 2021/0374985 | A1 * | 12/2021 | Bleicher | G06T 7/50 |
| 2022/0245882 | A1 * | 8/2022 | Spring | G06T 15/00 |

(Continued)

FOREIGN PATENT DOCUMENTS

WO    WO-2023023108 A1 *  2/2023  ............ G06T 7/194

*Primary Examiner* — Mia M Thomas

(57)        ABSTRACT

An example method includes: obtaining, by a depth sensor, depth data representing a distance to a target object and an environment of the target object; selecting a subset of the depth data representing a reference surface in the environment; comparing the subset of the depth data to a flatness condition; when the subset of the depth data does not meet the flatness condition: determining a faulty condition of the depth sensor, and outputting an indicator of the faulty condition of the depth sensor.

15 Claims, 7 Drawing Sheets

300

(56)         References Cited

U.S. PATENT DOCUMENTS

| | | | |
|---|---|---|---|
| 2023/0189982 A1* | 6/2023 | Rubio .................... | A47C 17/38 |
| | | | 5/11 |
| 2023/0237693 A1* | 7/2023 | Li .......................... | G06T 7/248 |
| | | | 382/107 |
| 2024/0054670 A1* | 2/2024 | Medagama ............ | G06V 20/70 |
| 2024/0193725 A1* | 6/2024 | Medagama ........... | G06T 17/205 |
| 2025/0139797 A1* | 5/2025 | Nuwan Kumara ....... | G06T 7/50 |

* cited by examiner

300

600

604

608

612    616

704-1

700-1

704-2

700-2

SYSTEM AND METHOD FOR VALIDATING DEPTH DATA FOR A DIMENSIONING OPERATION

BACKGROUND

Determining the dimensions of objects may be necessary in a wide variety of applications. For example, it may be desirable to determine the dimensions of packages in a warehouse prior to shipping. Dirt, streaks, or other faults of depth sensors used to capture data for the dimensioning operation may cause reduced accuracy in the resulting determined dimensions.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
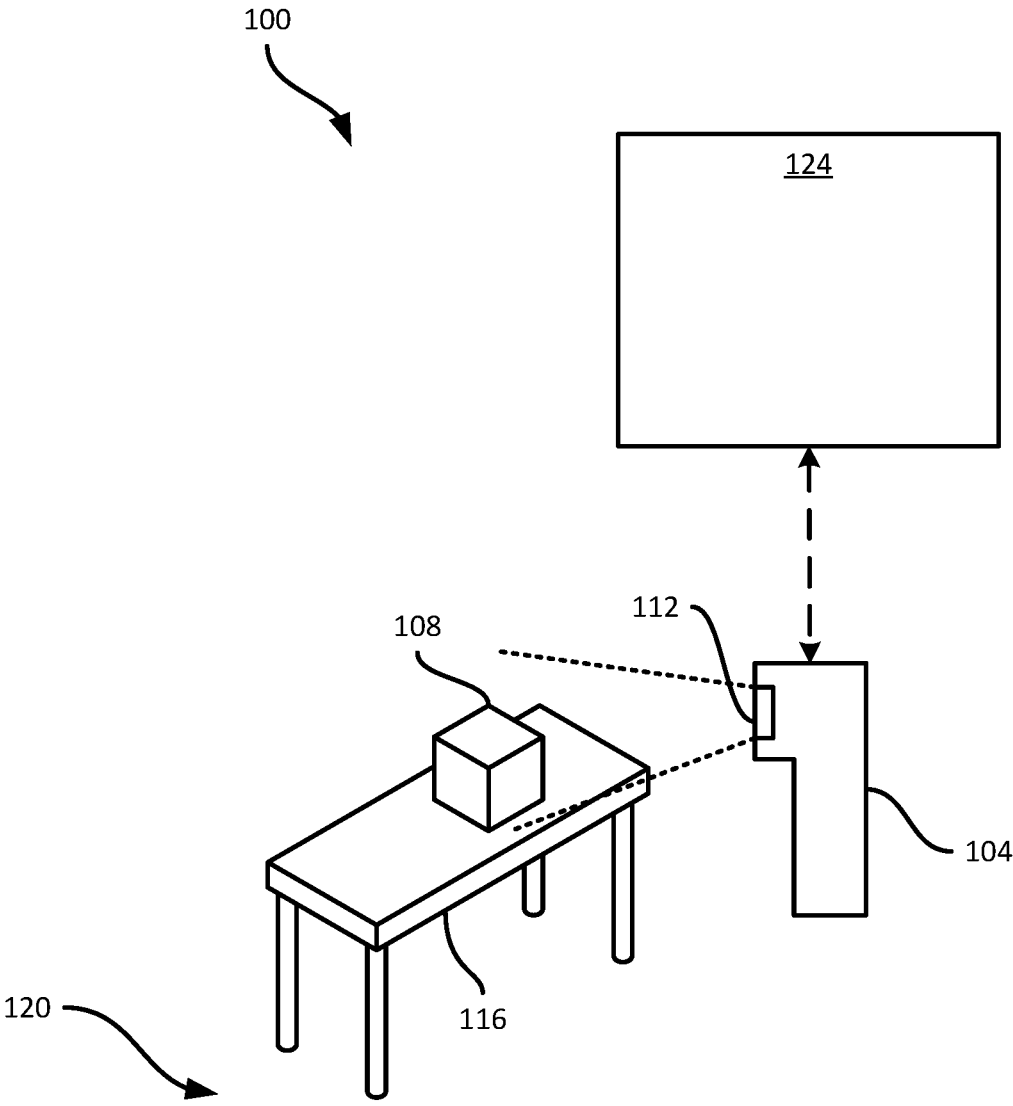
FIG. 1 is a schematic diagram of an example system for validating depth data for a dimensioning operation.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method comprising: obtaining, by a depth sensor, depth data representing a distance to a target object and an environment of the target object: selecting a subset of the depth data representing a reference surface in the environment: comparing the subset of the depth data to a flatness condition: when the subset of the depth data does not meet the flatness condition: determining a faulty condition of the depth sensor; and outputting an indicator of the faulty condition of the depth sensor.

Additional examples disclosed herein are directed to a system comprising: a depth sensor configured to obtain depth data representing a distance to a target object and an environment of the target object: a processor interconnected with the depth sensor, the processor configured to: select a subset of the depth data representing a reference surface in the environment: compare the subset of the depth data to a flatness condition: when the subset of the depth data does not meet the flatness condition: determine a faulty condition of the depth sensor; and output an indicator of the faulty condition of the depth sensor.

FIG. 1 depicts a system 100 for validating depth data for dimensioning a target object in accordance with the teachings of this disclosure. The system 100 includes a computing device 104 (also referred to herein as simply the device 104). The device 104 may preferably be a mobile or handheld device, but in other examples may be a fixed computing device. The system 100 further includes a sensor, or set of sensors, such as image sensors (e.g., optical cameras, infrared sensors, etc.), ambient light sensors, proximity sensors, temperature sensors, and the like to capture object data representing the object 108 and an environment surrounding the object 108.

Preferably, the sensor or set of sensors is integrated with the device 104. In particular, in the present example, the device 104 includes a depth sensor 112 configured to capture depth data (i.e., a point cloud) representing distances of the depth sensor 112 to the object 108 and the environment, including, for example, a table 116 on which the object 108 is sitting, and a floor 120 of, for example, a facility for processing the object 108. The depth sensor 112 may be a time-of-flight (ToF) camera, a stereo camera assembly, a LIDAR sensor, or the like.

The device 104 may be in communication with a server 124 via a communication link, illustrated in the present example as including wireless links. For example, the link may be provided by a wireless local area network (WLAN) deployed by one or more access points (not shown). In other examples, the server 124 is located remotely from the device 104 and the link may therefore include one or more wide-area networks such as the Internet, mobile networks, and the like. The server 124 may be any suitable server environment, including a plurality of cooperating servers operating, for example in a cloud-based environment.

The system 100 is generally deployed to dimension objects, such as the object 108. In particular, the device 104 may be a dimensioning device, such as a mobile phone with dimensioning capabilities, a dedicated dimensioning device, or the like. In other examples, the device 104 and/or the depth sensor 112 may be operable to capture depth data for a dimensioning operation and may send the captured data to another device (e.g., the server 124) for dimensioning the object 108.

When capturing the depth data, any faults, such as blemishes including dirt, grease, smudges, scratches, and the like, on the depth sensor 112 (e.g., on a lens of the depth sensor or the like) may cause inflated or reduced depth measurements, leading to depth data which does not accurately reflect the scene. Thus, in accordance with the present disclosure, the device 104 and/or the server 124 may first validate the depth data captured by the depth sensor 112 as being sufficiently accurate to apply a dimensioning operation prior to dimensioning the target object 108.

Figure 2:
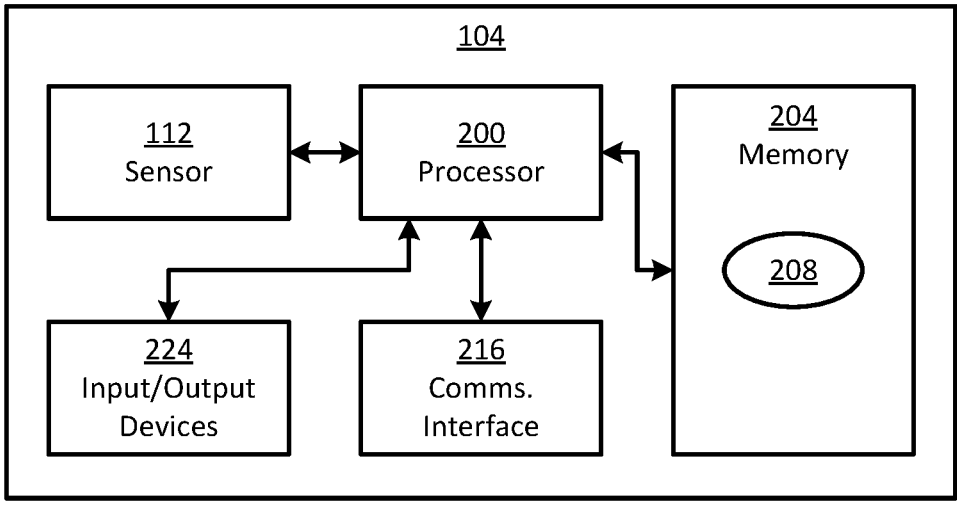
FIG. 2 is a block diagram of certain internal hardware components of the dimensioning device of FIG. 1.

Turning now to FIG. 2, certain internal components of the computing device 104 are illustrated. The device 104 includes a processor 200 interconnected with a non-transitory computer-readable storage medium, such as a memory 204. The memory 204 includes a combination of volatile memory (e.g. Random Access Memory or RAM) and nonvolatile memory (e.g. read only memory or ROM, Electrically Erasable Programmable Read Only Memory or EEPROM, flash memory). The processor 200 and the memory 204 may each comprise one or more integrated circuits.

The memory 204 stores computer-readable instructions for execution by the processor 200. In particular, the memory 204 stores an application 208 which, when executed by the processor, configures the processor 200 to perform various functions discussed below in greater detail and related to the target detection and modelling operation of the device 104. The application 208 may also be implemented as a suite of distinct applications. The memory 204 also stores a repository storing rules and data for the depth data validation operation.

Those skilled in the art will appreciate that the functionality implemented by the processor 200 may also be implemented by one or more specially designed hardware and firmware components, such as a field-programmable gate array (FPGAs), application-specific integrated circuits (ASICs) and the like in other embodiments. In an embodiment, the processor 200 may be, respectively, a special purpose processor which may be implemented via dedicated logic circuitry of an ASIC, an FPGA, or the like in order to enhance the processing speed of the operations discussed herein.

The device 104 also includes a communications interface 216 enabling the device 104 to exchange data with other computing devices such as the server 124. The communications interface 216 is interconnected with the processor 200 and includes suitable hardware (e.g. transmitters, receivers, network interface controllers and the like) allowing the device 104 to communicate with other computing devices-such as the server 124. The specific components of the communications interface 216 are selected based on the type of network or other links that the device 104 is to communicate over. The device 104 can be configured, for example, to communicate with the server 124 using the communications interface to send data to the server 124.

The device 104 may further include one or more input and/or output devices 224. The input devices 224 may include one or more buttons, keypads, touch-sensitive display screens or the like for receiving input from an operator. The output devices 224 may further include one or more display screens, sound generators, vibrators, or the like for providing output or feedback to an operator.

Figure 3:
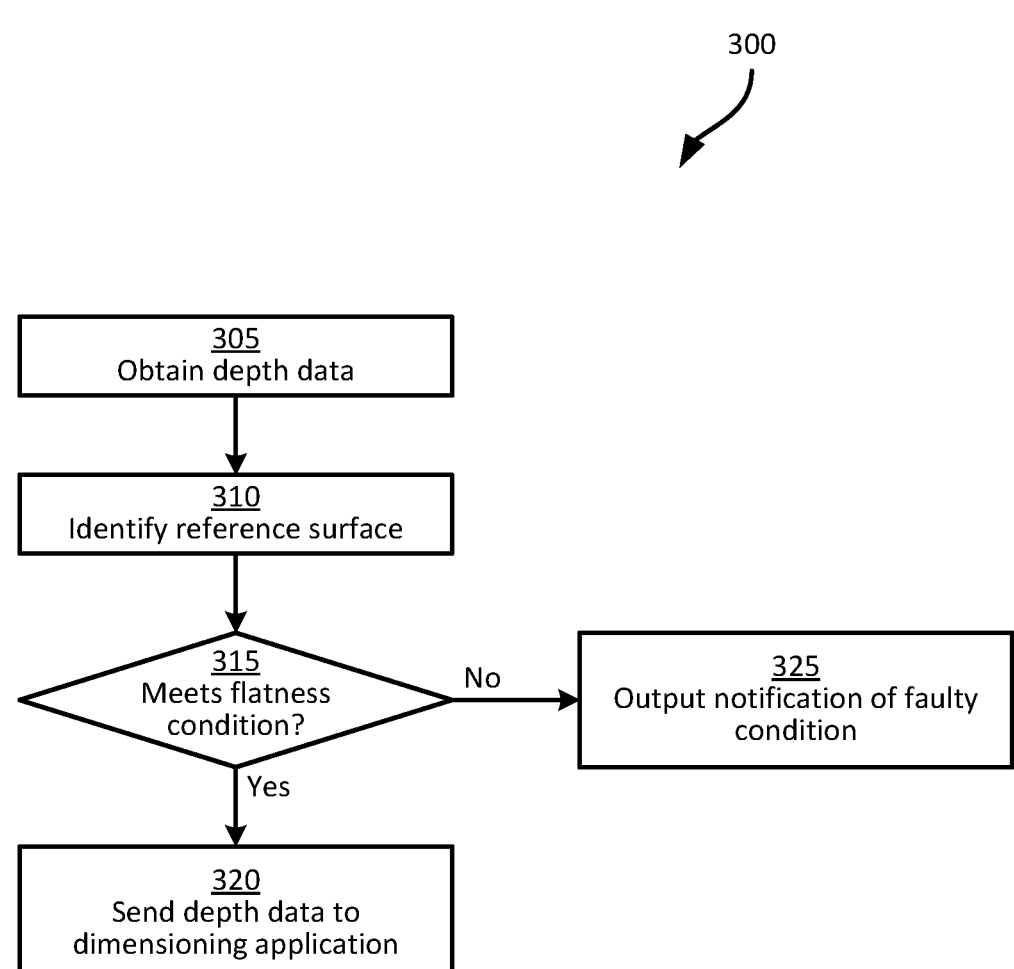
FIG. 3 is a flowchart of an example method of validating depth data.

Turning now to FIG. 3, the functionality implemented by the device 104 will be discussed in greater detail. FIG. 3 illustrates a method 300 of validating depth data for dimensioning a target object. The method 300 will be discussed in conjunction with its performance in the system 100, and particularly by the device 104, via execution of the application 208. In particular, the method 300 will be described with reference to the components of FIGS. 1 and 2. In other examples, the method 300 may be performed by other suitable devices or systems, such as the server 124.

The method 300 is initiated at block 305, where the depth sensor 112 captures depth data representing the target object 108 and at least a portion of the environment surrounding the target object 108. For example, the depth data may include portions of the table 116 and/or the floor 120.

At block 310, the device 104 identifies a reference surface in the scene captured by the depth sensor 112. The reference surface is a surface in the environment which is expected to be substantially flat. For example, the reference surface may be a surface on which the target object 108 is sitting (e.g., a top surface of the table 116), the floor 120, or the like.

For example, to identify the reference surface, the device 104 may first segment the depth data into groups or regions generally representing single objects or surfaces. The device 104 may use any suitable point cloud segmentation algorithm, including edge-based segmentation, region-growing segmentation, clustering, model-fitting, and the like.

The device 104 may identify one of the groups as representing the target object 108 and may remove the identified group from consideration for the reference surface. The device 104 may identify the target object 108, for example, as the group of segmented depth data containing the center of a field of view of the depth sensor 112 (i.e., the point in the center of the point cloud), under the assumption that the target object 108 will be roughly centered in the field of view of the depth sensor 112 for the dimensioning operation. In other examples, the device 104 may identify the target object 108 as the group of segmented depth data having approximately a predefined shape, size, volume, or the like, based on expected parameters of the target object 108.

The device 104 may apply criteria to one or more parameters of each group or region to identify one of the remaining regions as representing the reference surface. For example, the device 104 may identify the reference surface as the group having the lowest average height, to select the floor 120 as the reference surface. In other examples, may consider other parameters, such as groups which represent an approximately horizontal surface, the size of the group (e.g., to select the largest group as representing the floor 120), or the like, instead of or in addition to the height. The device 104 may additionally consider combinations of parameters in identifying a reference surface. For example, the device 104 may select a horizontal surface having a height approximately matching a lowest height of the target object 108 to select, as the reference surface, a top surface of the table 116 on which the target object 108 is sitting.

Figure 4:
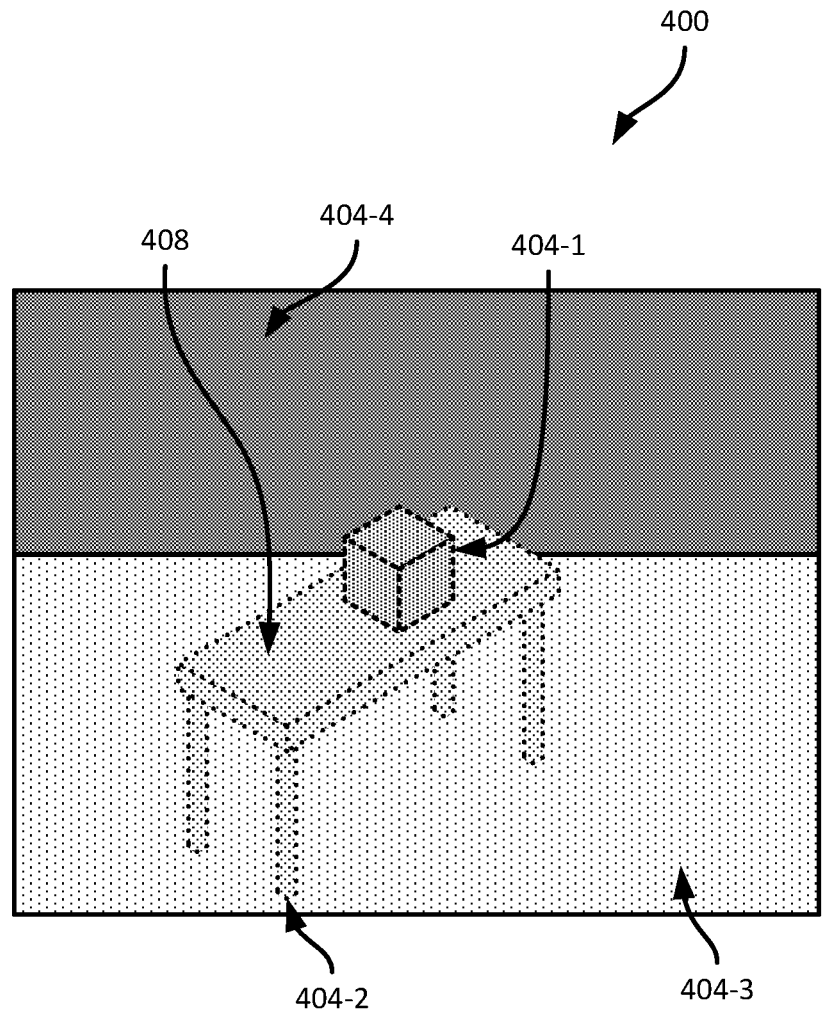
FIG. 4 is a schematic diagram of an example performance of block 310 of the method of FIG. 3.

For example, referring to FIG. 4, an example point cloud 400 captured by the depth sensor 112 is depicted. The point cloud may be segmented into regions 404-1, 404-2, 404-3, and 404-4 (referred to herein generically as a region 404 and collectively as regions 404), representing, respectively, the target object 108, the table 116, the floor 120, and a wall.

The device 104 may identify the region 404-1 as representing the target object 108 due to the region 404 being approximately centered in the point cloud 400. The device 104 may therefore remove the region 404-1 from consideration as the reference surface. The device 104 may then apply a criteria to select one of the remaining regions 404-2, 404-3, and 404-4 as representing the reference surface. For example, the device 104 may select the region 404-3 as the region having the largest area, or the region with the lowest average height. Alternatively, the device 104 may select the region 404-2, and more particularly, a top horizontal surface 408 of the region 404-2 as being an approximately horizontal surface near a lowest height of the region 404-1. As will be appreciated other parameters and criteria may also be considered in selecting a region 404 as representing a reference surface in the environment of the target object 108.

For example, the device 104 may determine perspective projection points, defined by a point in the point cloud along a ray extending from the depth sensor through a point of interest (e.g., a corner, a top-most point, or the like) of the target object 108. The perspective projection points may be, for example, points on the table 116, the floor 120, the wall, or the like, depending on the point of interest and the angle of the device 104 relative to the target object 108. The device 104 may additionally determine orthogonal projection points, defined by a point in the point cloud along a ray extending from a point of interest orthogonally to a detected plane. For example, the detected plane may be a top plane of a cuboidal target object 108. The orthogonal projection points may also be points on the table 116, the floor 120, the wall, or the like. Depending on the angle of the device 104 and more particularly the depth sensor 116, the perspective and orthogonal projection points may correspond to different surfaces and/or may not exist in the point cloud (i.e., due to being blocked by other objects and/or otherwise not within the field of view of the depth sensor 116). The device 104 may use the number of perspective and orthogonal projection points (e.g., based on predefined thresholds or the like) to select the reference surface.

After identifying the reference surface within the environment of the object, the device 104 may select the segmented region (or a further subset thereof) of the depth data as the subset of depth data representing the reference surface for further processing.

Returning to FIG. 3, having selected the subset of depth data representing the reference surface, the device 104 proceeds to block 315. At block 315, the device 104 determines whether the subset meets a flatness condition. That is, the device 104 determines whether the subset defines a sufficiently flat surface to reasonably match the expected flatness of the reference surface. In particular, if the subset defines a surface with waves, curvy artifacts, or the like, then the device 104 may determine that the depth data captured by the depth sensor 112 is not accurately representative of the reference surface, and hence the depth data may not be sufficiently representative to obtain accurate dimensions of the target object 108 in a subsequent dimensioning operation.

Figure 5:
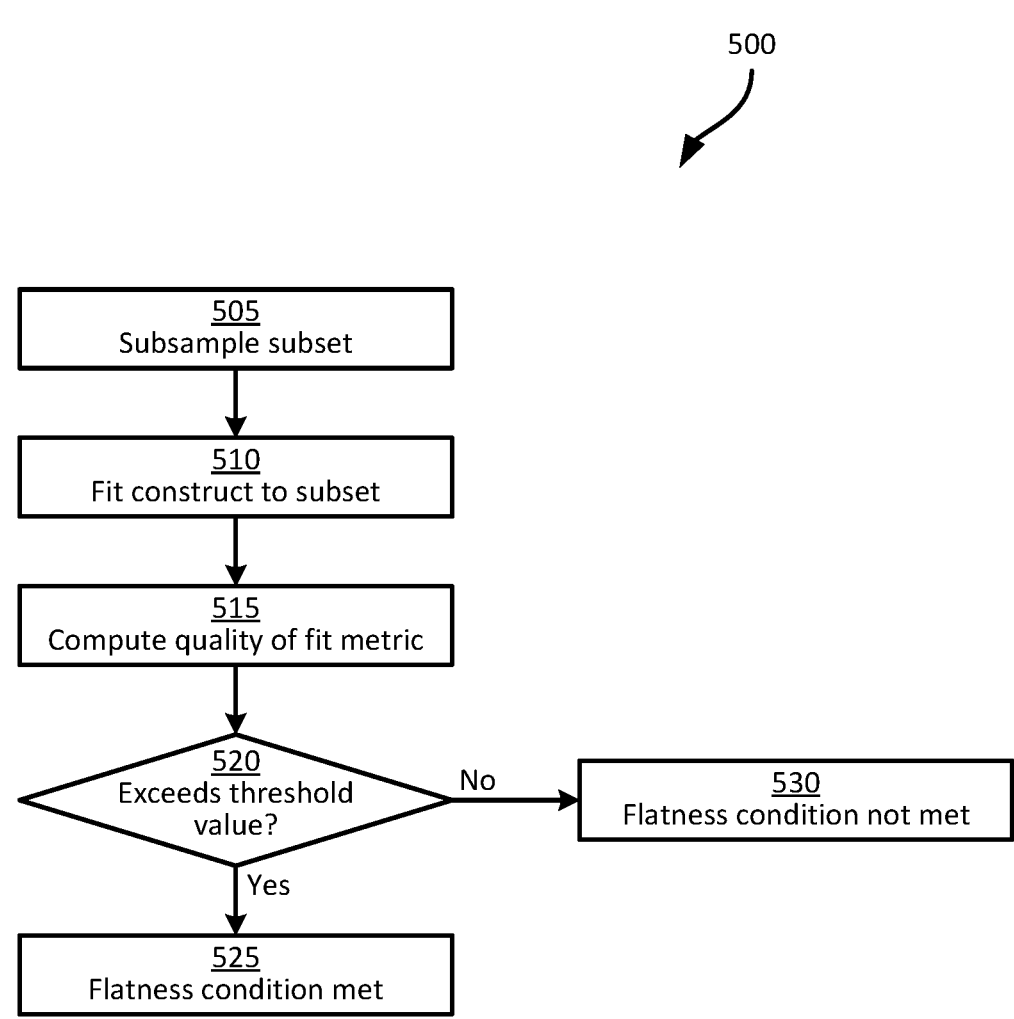
FIG. 5 is a flowchart of an example method of determining if a flatness condition is met at block 315 of the method of FIG. 3.

For example, referring to FIG. 5, an example method 500 of determining whether a subset of depth data meets a flatness condition is depicted.

At block 505, the device 104 may optionally subsample the subset representing the reference surface. For example, the device 104 may apply a mask of lines to the subset. The device 104 may then select the points from the subset which correspond to (e.g., at least partially intersect with) one of the lines of the mask. In particular, since the lines of the mask are straight and the reference surface is expected to be flat, the points selected from subset via the mask are expected to form a similarly straight line. That is, application of the mask allows a further simplification of the determination of the flatness condition. The mask may include a plurality of spaced horizontal and vertical lines to capture a sufficient number of points in the reference surface and to mitigate for outlying data.

Figure 6:
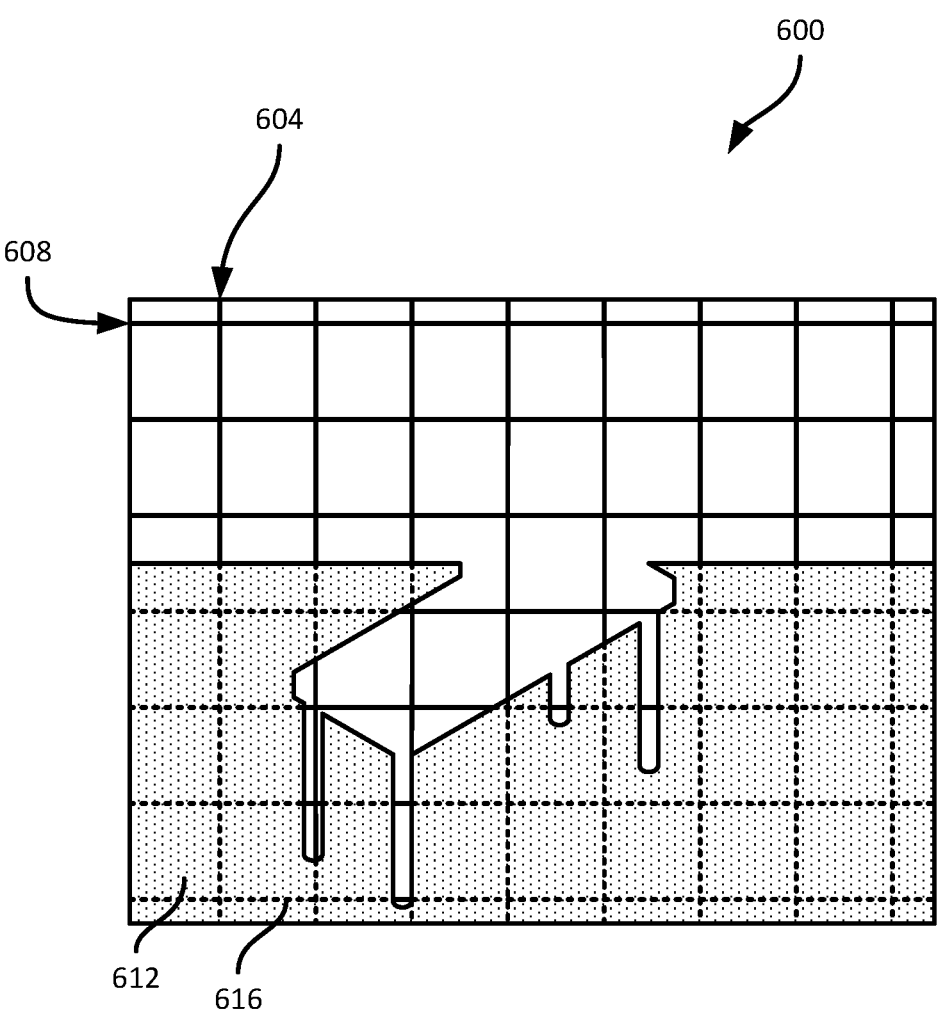
FIG. 6 is a schematic diagram of an example performance of block 505 of the method of FIG. 5.

For example, referring to FIG. 6, an example mask 600 includes a plurality of horizontally spaced lines 604 and a plurality of vertically spaced lines 608. The mask may be overlaid with the subset of depth data 612 selected as representative of the reference surface (i.e., corresponding to region 404-3 in FIG. 4). Application of the mask 600 may result in the subset 612 being subsampled to obtain a further subset 616 of points which lie on either the horizontally spaced lines 604 or the vertically spaced lines 608.

Returning to FIG. 5, at block 510, the device 104 fits a construct to the subset of depth data. For example, the device 104 may fit a plane to the subset representing the reference surface, or a line to the subsampled subset obtained at block 505 from application of the line mask. That is, the device 104 may identify a line or a plane which best fits the subset of depth data.

At block 515, the device 104 computes a metric to represent a quality of fit of the construct to its corresponding subset of the depth data.

For example, to determine a quality of fit of the construct to its corresponding subset, the device 104 may divide the set of points in the subset into inliers (i.e., within a threshold distance from the construct) and outliers (i.e., outside the threshold distance from the construct. The device 104 may then determine a ratio of the inlying points to the outlying points as the metric representative of the quality of fit. In other examples, to determine a quality of fit of the construct to its corresponding subset, the device 104 may determine an R-squared value of the subset to the construct, a correlation coefficient, or quality of fit metric.

Further, when comparing the subsampled subsets (i.e., via the mask applied at block 505) to corresponding lines, the device 104 may determine individual quality of fit metrics for each individual line in the mask, as well as an overall quality of fit metric for the subset. The overall quality of fit metric may be based on an average of the individual quality of fit metrics, or other suitable combination.

At block 520, having determined a metric representing the quality of fit of the construct to its corresponding subset of the depth data, the device 104 compares the metric to a threshold value, which may be predetermined based on the type of metric computed at block 515. For example, the device 104 may require a ratio of at least 90% or 95% inliers, an R-squared value of at least 0.7, or other suitable thresholds. In some examples, the predetermined threshold values may vary based on the accuracy required for the subsequent dimensioning application.

If, at block 520, the metric exceeds the threshold value, then at block 525, the device 104 determines that the flatness condition is met. That is, the device 104 determines that the subset of depth data defines a sufficiently flat surface to be representative of the expected flatness of the reference surface.

If, at block 520, the metric does not exceed the threshold value, then at block 530, the device 104 determines that the flatness condition is not met. That is, the device 104 determines that the subset of depth data defines a sufficiently wavy, curvy, or otherwise non-flat surface that a fault in the depth data is predicted. In particular, the device 104 may attribute the fault in the depth data to a faulty condition with the depth sensor 112 in obtaining the depth data.

Figure 7:
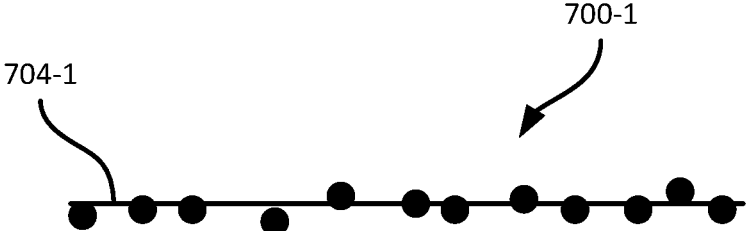
FIG. 7 is a schematic diagram of two example performances of block 510 of the method of FIG. 5.
Figure 7:
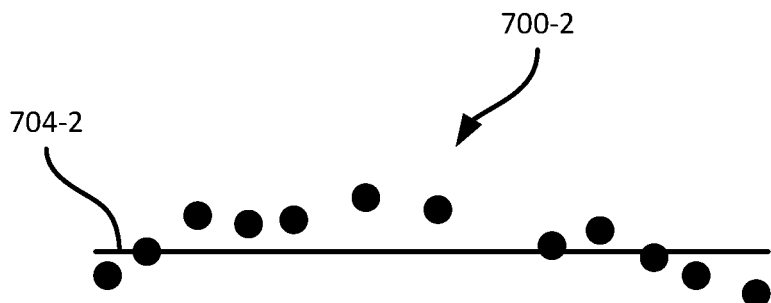

For example, referring to FIG. 7, schematic diagrams of a subsampled subsets 700-1 and 700-2 (e.g., after performance of block 505 and application of the mask of lines) are depicted. Each of the subsampled subsets 700 is also overlaid with a corresponding line of best fit 704-1 and 704-2. In the example of the subsamples subset 700-1, the line of best fit 704-1 can be seen to approximate the subset 700-1 fairly well, resulting in a high ratio of inliers to outliers, a high R-squared value, or other suitable quality of fit metric. Accordingly, the subset 700-1 may be determined to meet the flatness condition.

In contrast, the line of best fit 704-2 does not approximate the subset 700-2 very well, resulting in a low ratio of inliers to outliers, a low R-squared value, or other suitable quality of fit metric. Accordingly, the subset 700-2 may be determined to not meet the flatness condition.

Returning to FIG. 3, if, at block 315, the device 104 determines that the subset representing the reference surface meets the flatness condition, then the device 104 proceeds to block 320. At block 320, the device 104 may send the depth data obtained at block 305 to a dimensioning application to dimension the target object 108. That is, since the subset is determined to sufficiently represent the flatness of the reference surface, the device 104 determines that the depth data representing the target object 108 is likely to sufficiently represent the target object 108 to obtain sufficiently accurate dimensions from said depth data.

If, at block 315, the device 104 determines that the subset representing the reference surface does not meet the flatness condition, then the device 104 proceeds to block 325. At block 325, the device 104 determines that the depth data is faulty and hence may attribute to the fault in the depth data to a faulty condition with the depth sensor 112 used to obtain the depth data. Accordingly, the device 104 may output an indication of the faulty condition.

For example, the indication may be a notification on a display of the device 104. In some examples, the faulty condition of the depth sensor 112 may be assumed to be a blemish (e.g., dirt, grease, particulate matter or the like) on a lens or other optical element of the depth sensor 112, and hence the notification may prompt an operator of the device 104 to clean the lens of the depth sensor 112.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method comprising:

obtaining, by a depth sensor, depth data representing a distance to a target object and an environment of the target object;

selecting a subset of the depth data representing a reference surface in the environment; and comparing the subset of the depth data to a flatness condition;

when the subset of the depth data does not meet the flatness condition:

determining a faulty condition of the depth sensor; and outputting an indicator of the faulty condition of the depth sensor;

wherein selecting the subset of the depth data comprises:

segmenting the depth data into regions; and applying criteria to one or more parameters of each region to identify one of the regions as the reference surface; and wherein applying criteria to one or more parameters comprises:

identifying the reference surface as the region having a lowest average height;

identifying the reference surface as the region having a largest area; or identifying the reference surface as a horizontal region having a height approximately matching a lowest height of the target object.

2. The method of claim 1, wherein comparing the subset of the depth data to the flatness condition comprises:

fitting a construct to the subset of the depth data; and computing a metric representing a quality of fit of the construct to the subset of the depth data; and when the metric exceeds a predetermined threshold value, determining that the flatness condition is met.

3. The method of claim 2, wherein the construct comprises a plane or a line.

4. The method of claim 2, further comprising: applying a mask of lines to the subset of the depth data to subsample the subset of the depth data.

5. The method of claim 2, wherein the metric comprises one of: a ratio of inliers to outliers and an R-squared value.

6. The method of claim 1, further comprising: when the subset of the depth data meets the flatness condition, sending the depth data to a dimensioning application to dimension the target object.

7. The method of claim 1, wherein outputting the indicator comprises prompting an operator to clean a lens of the depth sensor.

8. A system comprising:

a depth sensor configured to obtain depth data representing a distance to a target object and an environment of the target object;

a processor interconnected with the depth sensor, the processor configured to:

select a subset of the depth data representing a reference surface in the environment; and compare the subset of the depth data to a flatness condition;

when the subset of the depth data does not meet the flatness condition:

determine a faulty condition of the depth sensor; and output an indicator of the faulty condition of the depth sensor;

wherein to select the subset of the depth data, the processor is configured to:

segment the depth data into regions; and apply criteria to one or more parameters of each region to identify one of the regions as the reference surface; and wherein to apply criteria to one or more parameters, the processor is configured to:

identify the reference surface as the region having a lowest average height;

identify the reference surface as the region having a largest area; or identify the reference surface as a horizontal region having a height approximately matching a lowest height of the target object.

9. The system of claim 8, wherein to compare the subset of the depth data to the flatness condition, the processor is configured to:

fit a construct to the subset of the depth data; and compute a metric representing a quality of fit of the construct to the subset of the depth data; and when the metric exceeds a predetermined threshold value, determine that the flatness condition is met.

10. The system of claim 9, wherein the construct comprises a plane or a line.

11. The system of claim 9, wherein the processor is further configured to: apply a mask of lines to the subset of the depth data to subsample the subset.

12. The system of claim 9, wherein the metric comprises one of: a ratio of inliers to outliers and an R-squared value.

13. The system of claim 8, wherein the processor is further configured to: when the subset of the depth data meets the flatness condition, send the depth data to a dimensioning application to dimension the target object.

14. The system of claim 8, wherein to output the indicator, the processor is configured to prompt an operator to clean a lens of the depth sensor.

15. The system of claim 8, wherein the depth sensor and the processor are integrated into a dimensioning device.

* * * * *